United States Patent
Graham et al.

(10) Patent No.: US 8,862,668 B2
(45) Date of Patent: Oct. 14, 2014

(54) DISPLAYING NEWS TICKER CONTENT IN A SOCIAL NETWORKING SYSTEM

(71) Applicant: Facebook, Inc., Menlo Park, CA (US)

(72) Inventors: Mary Graham, San Francisco, CA (US); Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/161,979

(22) Filed: Jan. 23, 2014

(65) Prior Publication Data

US 2014/0136625 A1     May 15, 2014

Related U.S. Application Data

(63) Continuation of application No. 13/323,737, filed on Dec. 12, 2011, now Pat. No. 8,667,063.

(51) Int. Cl.
    *G06F 15/173*     (2006.01)
    *G06Q 50/00*     (2012.01)

(52) U.S. Cl.
    CPC .......... *G06F 15/17306* (2013.01); *G06Q 50/01* (2013.01)
    USPC .......................................... 709/204; 709/224

(58) Field of Classification Search
    USPC ........................................ 709/204, 205, 224
    See application file for complete search history.

(56) References Cited

U.S. PATENT DOCUMENTS

| | | | |
|---|---|---|---|
| 2007/0174389 A1* | 7/2007 | Armstrong et al. | 709/204 |
| 2008/0040673 A1* | 2/2008 | Zuckerberg et al. | 715/745 |
| 2009/0144369 A1* | 6/2009 | Brown | 709/205 |
| 2011/0246907 A1* | 10/2011 | Wang et al. | 715/751 |
| 2013/0151347 A1* | 6/2013 | Baldwin et al. | 705/14.66 |

FOREIGN PATENT DOCUMENTS

WO    WO 2010021835 A1 *   2/2010
WO    WO 2010147828 A1 * 12/2010

\* cited by examiner

*Primary Examiner* — Kostas Katsikis
(74) *Attorney, Agent, or Firm* — Fenwick & West LLP

(57) ABSTRACT

A social networking system displays raw stories about a user's friends' actions in a news ticker as those actions occur. The social networking system is monitored for actions associated with users connected with the target user. The social networking system may be continually monitored such that actions are identified in real-time as they are performed. The news ticker is updated such that stories including the identified actions and the associated connected users are displayed within a news ticker interface. The news ticker interface may be a dedicated portion of the social networking system interface, for example in a column next to a newsfeed. The news ticker interface may be updated in real time as actions associated with connected users are performed. The target user may select a displayed story in the news ticker, and additional information related to the selected story may be displayed, for instance in a separate interface.

22 Claims, 7 Drawing Sheets

DISPLAYING NEWS TICKER CONTENT IN A SOCIAL NETWORKING SYSTEM

CROSS REFERENCE TO RELATED APPLICATIONS

This application is a continuation of co-pending U.S. application Ser. No. 13/323,737, filed Dec. 12, 2011, which is incorporated by reference in its entirety.

BACKGROUND

This invention relates generally to social networking, and in particular to providing a news ticker of actions taken by users within a social networking system.

Social networking systems commonly provide mechanisms allowing users to interact with each other and with other social networking system objects within the social networking systems. A social networking system user may be an individual or any other entity, such as a business or other non-person entity. Social networking system information that is tracked and maintained by a social networking system may be stored as a social graph, which includes a plurality of nodes that are interconnected by a plurality of edges. A social graph node represents a social networking system object that can act on and/or be acted upon by another node. A social networking system object may be, for example, a social networking system user, non-person entities, content items, groups, social networking system pages, events, messages, concepts, or other social networking system objects, such as movies, bands, or books.

An edge between nodes in a social graph represents a particular kind of connection between the nodes, which may result from an action that was performed by one of the nodes on the other node. Examples of such actions by a social networking system user include listing social networking system objects in a user profile, creating or uploading content items to the social networking system, subscribing to or joining a social networking system group or fan page, sending a message to another social networking system user, making a purchase associated with a social networking system node, commenting on a content item, or RSVP'ing to an event. Thus, if a first user establishes a connection with a second user in the social networking system, the users may be represented by nodes, and the connection may be represented by an edge connecting the nodes. Further, if the first user sends a message to the second user or tags the second user in a picture stored by the social networking system, the message and tagging may be represented by additional edges between the nodes. Alternatively, the message and picture may be represented by nodes, which are connected by edges to the nodes representing the first and second user. A social graph, therefore, may be used to track the interactions between social networking system objects.

Social networking systems also commonly provide mechanisms displaying the interactions of other users in the social networking systems, referred to herein as "news stories" or simply "stories." Stories may be displayed in a social networking system graphical user interface (GUI) that displays the acting user, the action taken by the acting user, and the object acted upon by the acting user. For instance, if a user named Meredith uploads a photograph of her cat, the social networking system GUI may display the photograph in conjunction with the text "Meredith posted an image" and an image of Meredith. In this example, the acting user is Meredith, the action taken by Meredith is the uploading of the photo, and the object acted upon by Meredith is the photo. Likewise, if a user named Molly comments on the photograph, the social networking system GUI may display the full text of the comment below the photograph along with the text "Molly comments:" and an image of Molly. Additional information may be displayed in conjunction with a story. For example, if a story is about a user's RSVP to an event, details of the event may be displayed. Likewise, if a story is about a user's comment on a video, the video may be displayed.

Social networking systems may display an ordered plurality of stories within a portion of the social networking system GUI dedicated to the display of social networking system stories, referred to herein as a "newsfeed." Social networking systems often order stories according to an algorithmically-determined relevance to a viewing user, prioritizing the most relevant stories in a newsfeed (stories that the viewing user is likely to be interested in viewing), and preventing stories below a relevance threshold from being displayed. Algorithms are imperfect means of determining relevance, however, and thus certain stories that a viewing user would otherwise want to view are mistakenly determined to be too irrelevant to display in the newsfeed. Note that stories displayed in a newsfeed may be referred to herein as "feed stories."

Displaying all stories related to a viewing user (actions by users associated with the viewing user) in a newsfeed chronologically ensures that all relevant stories are displayed to a viewing user but is an impractical option, as typically only a subset of the stories related to a viewing user are relevant to the viewing user. In such cases, a viewing user may become frustrated by navigating all stories related to the viewing user in order to find stories of the most interest to the viewing user. Further, newsfeeds are static and require manual refreshing to display the most recent stories. In addition, newsfeeds are typically displayed in a dedicated social networking system page, and are not viewable when a user is viewing a different part of the social networking system. Finally, the amount of information displayed in conjunction with stories often increases the amount of social networking system GUI space required to display the story, resulting in a greater amount of content that a viewing user is required to navigate and increasing the amount of time a viewing user is required to spend searching for relevant stories.

SUMMARY

Embodiments of the invention provide a news ticker that provides stories to a target user within a social networking system. The target user may request news ticker content, for instance by requesting a social networking system page containing the news ticker. The news ticker content request may be continuous, for instance for as long as a news ticker is displayed to the target user. News ticker content, or "ticker stories", includes actions performed within the social networking system on one or more social networking system objects. Actions within the social networking system include communications, uploading photos or other content items, playing media items, and the like.

The social networking system is monitored for actions of users connected to the target user. Connected users may include users who have established connections with the target user. When a monitored action is identified, the news ticker is updated to display a story associated with the identified action and the associated connected user. The story is displayed within a news ticker interface, and may be displayed and updated in real-time, without input by the target user. The news ticker interface may include a dedicated portion of a social networking system GUI, such as a column, and stories may be ordered within the interface chronologically, with the most recent stories displayed at the top of the interface. The news ticker may also be displayed in the same interface as a newsfeed, where the news ticker includes all stories about other users' actions while the newsfeed contains selected stories that may be aggregated around an object or action.

The target user may select a story displayed in the news ticker. In response, additional information associated with the story may be displayed, for instance in an additional interface such as a window or column adjacent to the news ticker interface. The additional information may include communications associated with the selected story, the content items or media items associated with the selected story, and the like. The additional information may also be limited to information that is socially relevant to the target user, such as communications from friends of the target user.

BRIEF DESCRIPTION OF THE DRAWINGS

FIG. 3 is an example screenshot illustrating a social networking system interface for displaying news stories in a newsfeed and a news ticker, according to one embodiment.

FIG. 4 is an example screenshot illustrating the interface of FIG. 3, along with additional information for a selected news ticker story, according to one embodiment.

Figure 1:
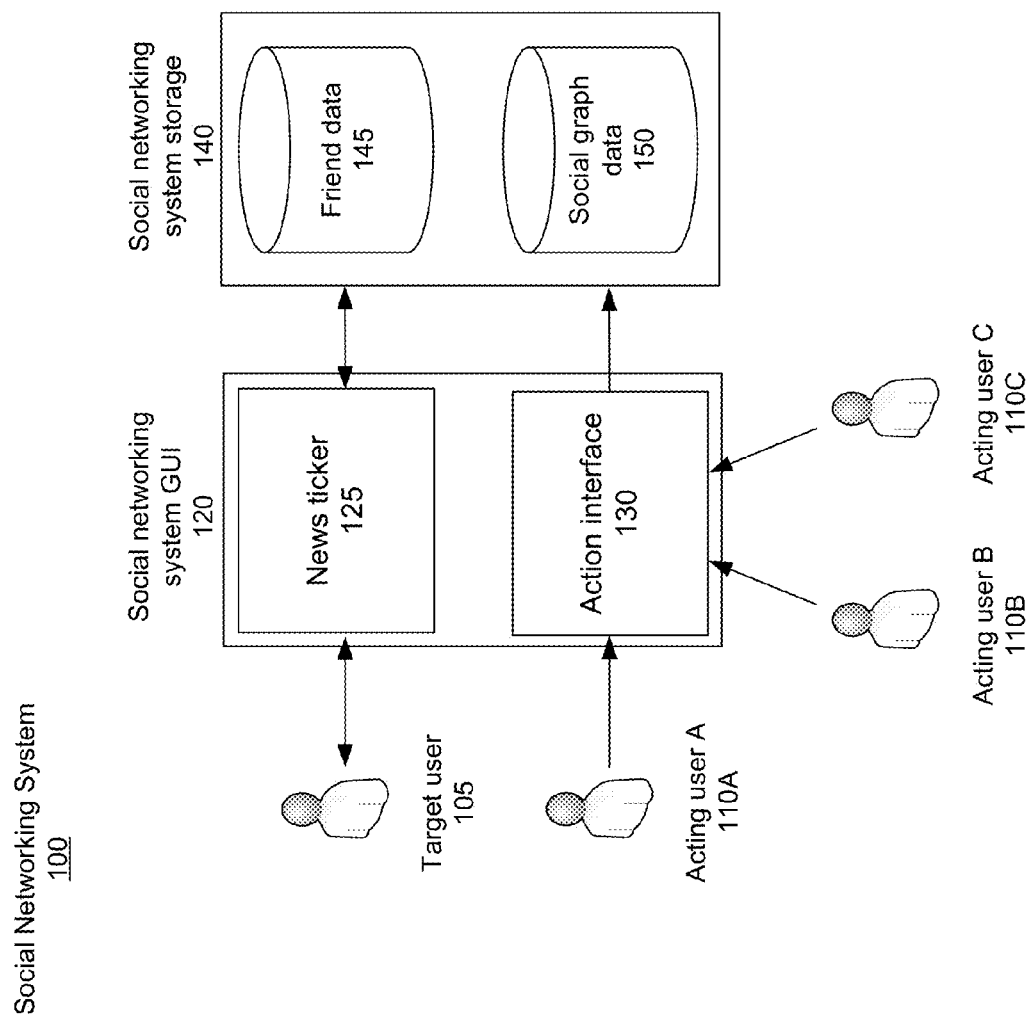
FIG. 1 is a diagram illustrating the creation and display of news stories in a social networking system ticker, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system may include a web-based interface comprising a series of inter-connected pages displaying and allowing users to interact with social networking system objects and other users. For example, a social networking system may display a page for each social networking system user including objects and information entered by or related to the social networking system user (the user's "profile"). Social networking systems may also contain pages containing pictures or videos, dedicated to concepts, dedicated to users with similar interests ("groups"), or containing communications or social networking system activity to, from or by other users.

Social networking system pages may contain links to other social networking system pages, and may include additional capabilities such as search, real-time communication, content-item uploading, purchasing, advertising, and any other web-based technology or ability. It should be noted that a social networking system interface may be accessible from a web browser or a non-web browser application, such as a dedicated social networking system mobile device or computer application. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, social networking system information that is tracked and maintained by a social networking system may be stored as a social graph, which includes a plurality of nodes that are interconnected by a plurality of edges (representing interactions, connections, communications or other measures of relatedness between nodes). A social graph node may represent a social networking system object that can act on and/or be acted upon by another node. An edge between nodes in a social graph represents any kind of connection or interaction between the two nodes, which may result from an action that was performed by one of the nodes on the other node. In this description, reference to an edge connecting two objects in a social graph is intended to refer to an edge connecting the nodes representing each of the two objects.

A social networking system object may be a social networking system user, non-person entity, content item, group, social networking system page, location, application, time or date, concept or other social networking system object, such as a movie, a band, or a book. Content items may be anything that a social networking system user or other object may create, upload, edit or interact with, such as messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Each social networking system object may be represented by a distinct social networking system node in a social graph.

Online social networking systems allow users to associate themselves, establish connections with and interact with other users of the social networking system. When two users establish a connection, they become "friends" (or, "connected") within the context of the social networking system. Being friends in a social networking system may allow users access to more information about each other than would otherwise be available to unconnected users. For instance, being friends may allow a user to view a profile page of another user, to see another user's friends, or to view actions taken within the social networking system by another user. In addition, being friends may allow a user greater access to interact with another user. For instance, being friends in the context of a social networking system may allow a user greater access to communicate with another user, to communicate about another user, to share objects and other information with another user, to comment on objects associated with another user, to endorse objects associated with another user, and so forth. Each association, established connection and interaction between two users is represented in the social graph by an edge connecting the users.

A social networking system may allow a user to establish a variety of types of connections with another user. For example, users may establish various personal relationships with another user in a social networking system, such as a friendship, a romantic relationship (such as dating, engagement, or marriage), or a familial relationship (such as parent/ child, grandparent/grandchild, aunt/uncle/niece/nephew, or cousin). In addition, users may establish non-personal relationships, such as employee/employer/co-worker or student/teacher/classmate. A social networking system may also allow a user to establish details of relationships, such as anniversaries or other relationship milestones. Each type of established connection may be represented by an edge in the social graph, and more than one edge may connect two users with an established relationship. For example, if two users are cousins and co-workers, a first edge may connect the users for establishing a connection in the social networking system, a second edge may connect the users for indicating that they are cousins, and a third edge may connect the users for indicating that they are co-workers.

A social networking system may allow users to communicate both within and external to the social networking system. For example, within a social networking system, a first user may send a second user a message, an email, an instant message, a voice call, and a video chat call. Communications may originate from within the social networking system but be transmitted external to the social networking system, for example, an email sent from within the social networking system but sent to the personal email account of another. Communications may also originate externally to the social networking system but be transmitted within the social networking system, for example, an instant message sent from instant messaging software and transmitted to an internal social networking system instant messaging interface. Further, a first user may comment on the profile page of a second user, or may comment on content items associated with a second user, such as content items uploaded by the second user. In addition, a user may communicate about another user by tagging the user in a message or content item. A user may also communicate without directing the communication at a particular other user by, for example, posting a status or message to the user's profile. Each communication may be represented by a node in the social graph, and an edge may connect the communicating users to each other and to the communication's node.

A social networking system may allow a user to upload pictures. Each picture may be represented by a node in the social graph, and an edge may connect the user who uploaded the picture to the picture. The social networking system may allow users to tag pictures by associating a picture or a location within the picture with the identity of a social networking system user. For example, a first user may recognize that an uploaded picture is an image of several friends, and may associate the identities of each friend with the location within the image of each friend's face. In addition, the social networking system may allow users to comment on, link to, share, communicate about, or edit the picture. In the social graph, an edge may connect users who have viewed, tagged, been tagged in, commented on, linked to, communicated about, or edited the picture to the node representing the picture. Likewise, an edge may connect users who have performed similar interactions with or been tagged in a video, document, song, or any other social networking system object to the node representing the video.

A social networking system may allow a user to endorse social networking system objects. In one embodiment, endorsement is expressed by clicking a "like" button associated with a social networking system object. The endorsement of an object may be displayed in conjunction with the object. For example, if a user likes an image uploaded to the social networking system, a message may be displayed below the image indicating that the user liked the image. A social networking system user may endorse (and otherwise interact) with social networking system objects outside of the context of the social networking system's pages that are connected to or associated with the social networking system. For instance, an article on a news web site might have a "like" button that users of the social networking system can click on to express approval of the article. In the social graph, an endorsement may be represented by an edge connecting the endorsing user to the endorsed object.

A social networking system may allow a user to recommend or share a social networking system object with another user. For example, a first user may recommend that a second user view a content item, attend an event, establish a connection with another user, or a join a group through the social networking system interface. Likewise, a user may share a content item with another user, for example, by clicking a link which emails the content item or otherwise brings the content item to the attention of the user. An edge may connect the first user and the second user, and may connect the first user and the second user to the recommended object. A second edge may connect the social networking system object to the second user if the second user accepts the recommendation.

A social networking system may allow users to create and schedule events. An event may have an associated real-world location, such as a concert, a party, a parade, or a sporting event, or may not have a real-world location, such as an online fundraising drive or an online sale. A social networking system may allow users to utilize social networking system calendar functionality when creating events, invite other users, create event descriptions, and utilize social networking system location functionality. Edges may connect the user who created the event, the users invited to the event, and the event itself. A second edge may connect the event to users who RSVP to the event, and a third edge may connect the event to users who use location-based functionality to check in to the event (for instance, users who use a social networking system application on a mobile phone with location-detection functionality such as GPS at the time of the event to indicate that they are in attendance of the event). Similarly, an edge may connect a user to any location the user checks in to using location-detection functionality.

A social networking system may allow a user to enter and display information related to the user's interests, education and work experience, contact information, and other biographical information in the user's profile page. Each school, employer, interest (for example, music, books, movies, television shows, games, political views, philosophy, religion, groups, or fan pages), geographical location, network, or any other information contained in a profile page may be represented by an object in the social graph. Further, an edge may connect a user with any object representing information in the user's profile page. For example, if in a profile page a user indicates attendance at "the University of Idaho," lists "Anchorman" as a favorite movie, and lists "Post Falls, Id." as a hometown, the user may be connected by an edge to objects representing the University of Idaho, Anchorman, and Post Falls, Id.

A social networking system may allow a user to play media and games within the social networking system. Edges connect the nodes representing each media item and game played with the node representing the user playing the media item or game. Additional nodes may represent milestones within media items and games. For example, if a user views a particular scene in a movie, an edge may connect the user's node with a node representing the scene in the movie. Likewise, if a user completes a particular level in a game, performs an in-game action, obtains a particular in-game item, or achieves a particular score, an edge may connect the user's node with nodes representing such milestones. In addition, a social networking system may allow users to share media and game milestones from media and games played outside the context of the social networking system using, for example, a social networking system plug-in. In such embodiments, an edge connects the user to nodes representing the external media and game milestones.

FIG. 1 is a diagram illustrating the creation and display of news stories in a social networking system ticker, according to one embodiment. A social networking system 100 includes a social networking system GUI 120 and a social networking system storage module 140. The social networking system GUI 120 includes, among other components, a news ticker module 125 and an action interface module 130. The social networking storage module 140 includes a friend data storage module 145 and a social graph data storage module 150.

In the embodiment of FIG. 1, a target user 105 accesses the social networking system 100 through the social networking system GUI module 120. The target user 105 may be a registered user of the social networking system 100, and may access the social networking system 100 through a client device, described below in greater detail. The target user 105 may access the social networking system news ticker through the news ticker module 125. As used herein, a "news ticker" or "ticker" refers to an interface within the social networking system 100 in which stories are displayed to a target user. The ticker may be a separate social networking system page, or may be displayed in a portion of social networking system GUI. In one embodiment, the ticker is displayed in a universal social networking system GUI displayed within all or most social networking system pages. The ticker may be moveable or customizable, allowing users to relocate the ticker, to resize the ticker, to adjust the display settings of the ticker, or to disable, minimize or hide the ticker. The target user 105 may request news ticker stories passively by merely accessing a social networking system page on which a news ticker is displayed. Alternatively, the target user 105 may explicitly request news ticker content by selecting a button, link or other option within a social networking system page. It should be noted that the target user 105 may request news ticker content simply by continuing to access a social networking system page on which a news ticker is displayed. For example, if a target user 105 opens a social networking system page on which a news ticker is displayed and doesn't close the page, the news ticker may continually update in response to the continual requests for news ticker content from the target user 105 stemming from maintaining the open page containing the ticker.

The news ticker displays stories to the target user. As discussed above, the stories displayed by the news ticker include the actions of users connected to the target user. In the embodiment of FIG. 1, acting user A 110A, acting user B 110B, and action user C 110C (collectively, "acting users 110") perform actions within the social networking system 100 via the action interface 130. Acting users 110 may be connected to the target user 105 explicitly, such as being friends within the context of the social networking system 100, or may be inexplicitly connected to the target user 105, such as by having biographical information or friends in common with the target user 105.

The acting users 110 may perform a variety of actions within the social networking system, including but not limited to: sending messages within or external to the social networking system 100, liking or otherwise endorsing a social networking system object, becoming friends with another social networking system user, playing a game, listening to a song, watching a video, editing a document, posting a status update, and changing biographical information within the social networking system. Additional actions may be performed within the social networking system, for example those actions which are discussed above and otherwise herein, all of which may be displayed to a target user 105 in a news ticker. The acting users 110 may be merely associated with an action performed in the social networking system 100, and this association may be displayed to the target user 105 in a news ticker. For example, an acting user 110 may be tagged in a photograph by a tagging user who is not connected to the target user 105. In such an embodiment, as an acting user 110 connected to the target user was associated with an action performed within the social networking system, the photo tagging action may be displayed to the target user 105 in a ticker. As displayed, the action interface 130 is a component within the social networking system GUI module 120, but it should be noted that actions may be performed by acting users 110 outside of the context of the social networking system 100 that are still tracked and stored by the social networking system 100.

When an acting user 110 connected to the target user 105 performs an action using the action interface 130 (or is associated with a performed action), the action is stored in the social graph data storage module 150 as an edge connecting the acting user 110 and any other objects associated with the action. For example, if the acting user 110 uploads an image to the social networking system 100, an edge is stored in the social graph data storage module 150 connecting the acting user's node and the node representing the uploaded image. Likewise, if a user comments on the acting user's wall, an edge is stored in the social graph data storage module 150 connecting the user's node to the acting user's node. Generally, each action performed in the social networking system 100 involves a user and at least one other object (whether it one or more other users, a content item, a concept, etc.). Actions involving acting users 110 are thus stored in the social graph data storage module 150 as edges connecting one or more acting users 110 to one or more other objects. It should be noted that in some embodiments, stored actions involve the target user 105, for example, if an acting user 110 shares a link with the target user 105. Actions are stored in the social graph data storage module 150 with a timestamp indicating the time the actions occurred.

When the target user 105 requests news ticker content, the news ticker module 125 identifies social networking system users (such as the acting users 110) connected to the target user 105 using the friend data storage module 145. In one embodiment, the identities of users who have explicitly established connections with the target user 105 are retrieved. Alternatively, users with common friends, common biographical information, or any other users related to the target user 105 may be identified. When users connected to the target user 105 are identified, actions performed by or involving the identified users are identified using the social graph data storage module 150. The identified actions of users connected to the target user 105 include the actions performed by the users connected to the target user 105, and the identities of any objects associated with the actions. For example, an identified action may be the tagging of User B by User A in a photograph.

The news ticker module 125 retrieves the identified actions of acting users 110 connected to the target user 105 and displays the identified actions as stories within the news ticker interface. The displayed stories may be limited to text, either plain or URL-linked. Using the above example, the text "User B was tagged in a photo by User A" may appear in the news ticker interface. The stories displayed in the news ticker interface may be organized chronologically, by importance or relevance, or by any other suitable organization. In one embodiment, the news ticker displays a story for every action with which a user connected to the target user 105 is associated.

In one embodiment, the news ticker module 125 continually queries the social graph data storage module 150 for actions performed by the acting users 110 connected to the target user 105. In this embodiment, the news ticker module 125 retrieves actions performed by the acting users 110 in real-time, and displays these actions in the news ticker interface. From the perspective of the target user 105, the news ticker updates automatically. In the event that stories are displayed chronologically in the news ticker, the news ticker continually displays the most recent action performed by or involving an acting user 110, for instance at the top of the news ticker interface. In this embodiment, each time a story involving a subsequent action is displayed, the story is displayed at the top of the news ticker interface and all older stories are shifted downward within the interface. The news ticker interface itself may display a limited number of stories, and when a particular story gets shifted to the bottom-most position within the interface (indicating that the particular story is the oldest story displayed within the interface), the next time a new story is displayed, the oldest story is shifted downward and out of the news ticker interface such that the oldest story is no longer displayed within the interface.

Clicking on or otherwise selecting a story displayed in the news ticker may cause additional information associated with the selected story to be displayed. Selecting a story may cause actions related to the selected story to be displayed. For example, clicking on a story involving a photograph uploaded by User A may display comments on the photo posted by other users. Clicking on a story involving a comment posted by User A onto User B's wall may display other comments displayed on User B's wall, or may display a history of comments between User A and User B onto each other's walls.

Selecting a story may cause objects related to the story to be displayed. For example, selecting a story about a comment left on a photograph by User B may cause the photograph to be displayed, along with all communications about the photograph in, for example, in chronological order. The news ticker module 125 retrieves this additional information from the social graph data storage module 150. The social graph data storage module 150, in response to a query from the news ticker module 125, identifies actions and objects related to the selected story, which are then displayed to the target user 105.

Selecting a story associated with a media item, such as a song or a video, may cause the media item to be displayed in an interactive media player, allowing the target user 105 to play the media item, and may cause additional information about the media item to be displayed, such as the media item band, actors, directors, year of creation, and a link or other information about where to purchase the media item. Selecting a story associated with a social networking system game may cause the game to be displayed in a playable interface, or may cause additional information about the game to be displayed, such as the maker of the game, top scores associated with the game, or friends who have played the game.

Selecting a story associated with an event may cause additional information about the event to be displayed, such as the location of the event, the purpose of the event, the time and date of the event, and the identities of any friends attending the event. In one embodiment, if the target user 105 has been invited to the event, or if the event is open to everyone, an RSVP interface is displayed in response to selecting the story associated with the event. Selecting a story associated with a location, for example User A checking into a coffee shop, may display additional information about the location, a map to the location, or the identities of other friends who have checked into the same location.

Selecting a story associated with a user altering the his or her biographic information, such as adding a school or employer, changing his/her political or religious views, changing his/her relationship status, etc., may display additional information about the biographic information, or may display the identities of users with common biographic information. Selecting a story associated with a user joining a group, following another user, or joining a fan page may display additional information about the group, other user, or fan page, such as a link to the group page, the other user's page, or the fan page, or may display the identities of friends who have also joined the group, follow the other user, or joined the fan page.

Selecting a story associated with a user becoming friends with another user within the social networking system may display additional information about the other user, may display the identities of common friends with the other user, and may display an interface to become friends with the other user. Selecting a story associated with a user liking a social networking system object may display the object, may display additional information related to the object, may display a link to the object, may display other friends who have liked the object, and may display an interface for the target user 105 to like the object.

In one embodiment, the additional information is displayed within the news ticker interface, for example, below the selected story, shifting all other stories in the news ticker downward. Alternatively, the additional information may be displayed in a separate interface, for instance in a pop-up bubble next to the news ticker interface, an additional ticker next to the news ticker, or in an area of the social networking system GUI 120 dedicated to additional news story information. In one example embodiment, the news ticker is displayed in a first column within a social networking system page, and the additional information associated with selected news ticker stories are displayed in a second column adjacent to the first column. Clicking on or otherwise selecting a story displayed in the news ticker may direct the target user 105 to a separate social networking system page display additional information related to the story.

The additional information displayed as a result of selecting a story displayed in a news ticker may be limited to or organized by information determined to be relevant to the target user 105. For example, if the target user 105 selects a story associated with a photograph, the photograph as well as all comments on the photograph may be displayed, or the displayed comments may be limited to comments by users associated with the target user 105 (such as friends of the target user 105). In identifying additional information associated with a selected story to display to the target user 105, the news ticker module 125 may query the social graph data storage module 150 to identify actions and objects related to the selected story, may query the friend data storage module 145 to identify users connected to the target user 105, and may filter the identified actions and objects using the identified users to identify actions and objects related to the selected story which are socially relevant to the target user 105.

System Architecture

Figure 2:
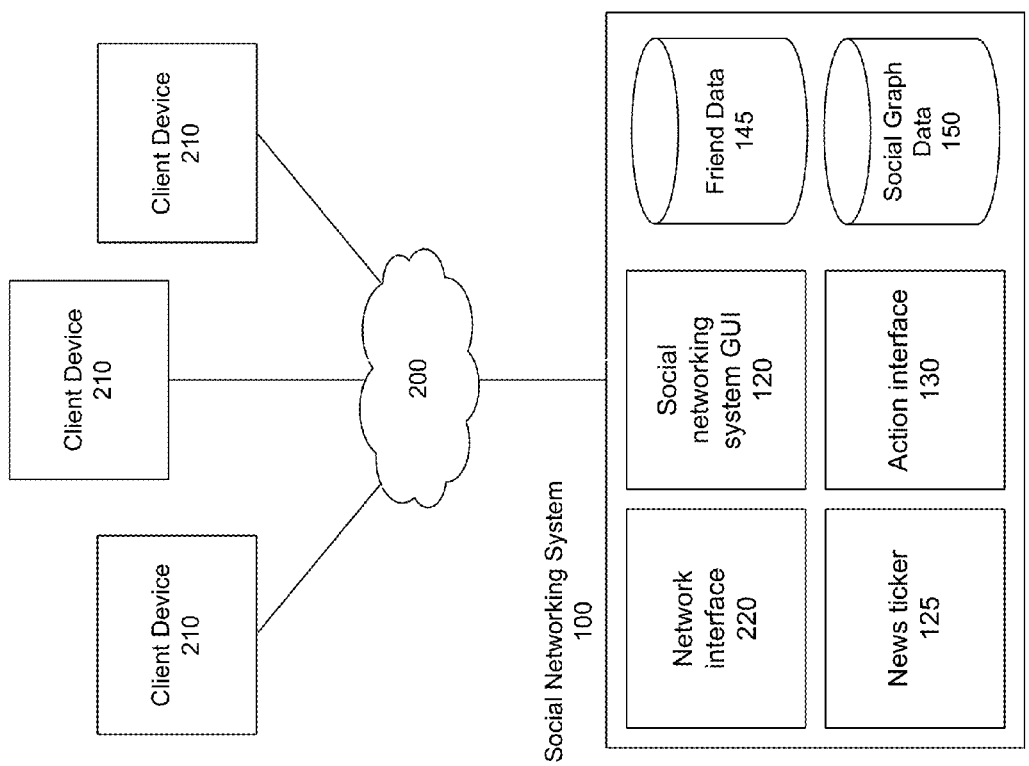
FIG. 2 is a high level block diagram of a system environment suitable for displaying news stories in a news ticker, according to one embodiment.

FIG. 2 is a high level block diagram of a system environment suitable for displaying news stories in a news ticker, according to one embodiment. The system environment includes client devices 210 and social networking system 100 that communicate through a connecting networking 200. Although three client devices 210 are shown in FIG. 2, any number of client devices may communicate with the social networking system 100, for example thousands or millions.

The connecting network may be the Internet, a local area network, a wireless network, a cellular network, or any other network that allows communication between modules. The connecting network 200 may use standard communications technologies and/or protocols. In alternative configurations, different and/or additional modules can be included in the system. In addition, the connecting network 200 may include a combination of networks. For example, in the embodiment where a client device 210 is a mobile phone, the connecting network 200 may include a cellular phone wireless network which interfaces with the Internet, allowing the mobile phone to connect with a social networking system's web servers.

The client devices 210 may include any type of device capable of sending or receiving communications to and from the social networking system 100, such as a mobile phone, a laptop, a netbook, a tablet, a desktop computer, or a television. A user of a client device 210 interacts with the social networking system 100 via an application, such as a web browser or a native application, to perform social networking system operations such as browsing content, posting and sending messages, establishing connections with other users, uploading pictures and other content items, to transmit and receive any other communications to and from the social networking system 100, and to perform any other social networking system actions.

The social networking system 100 as illustrated includes a network interface 220, a social networking system GUI module 120, a news ticker module 125, an action interface module 130, a friend data storage module 145, and a social graph data storage module 150. In alternative embodiments, the social networking system 100 includes fewer, additional, or different components than are illustrated in FIG. 2. For example, the friend data storage module 145 and the social graph data storage module 150 may be combined into a single storage module. The networking interface 220 manages all communications and provides the interface between the client devices 210 and the social networking system 100.

The pages of the social networking system 100 may be hosted on one or more web servers, not illustrated in FIG. 2. These pages may include information retrieved from one or more social networking system databases, such as the friend data storage module 145, the social graph data storage module 150, and other databases not illustrated in FIG. 2. Other components required to operate a website, a data center, a data service and the like may additionally be included within the social networking system 100, but are also not illustrated in FIG. 2, for the purposes of simplicity.

Example News Ticker Layouts

Figure 3:
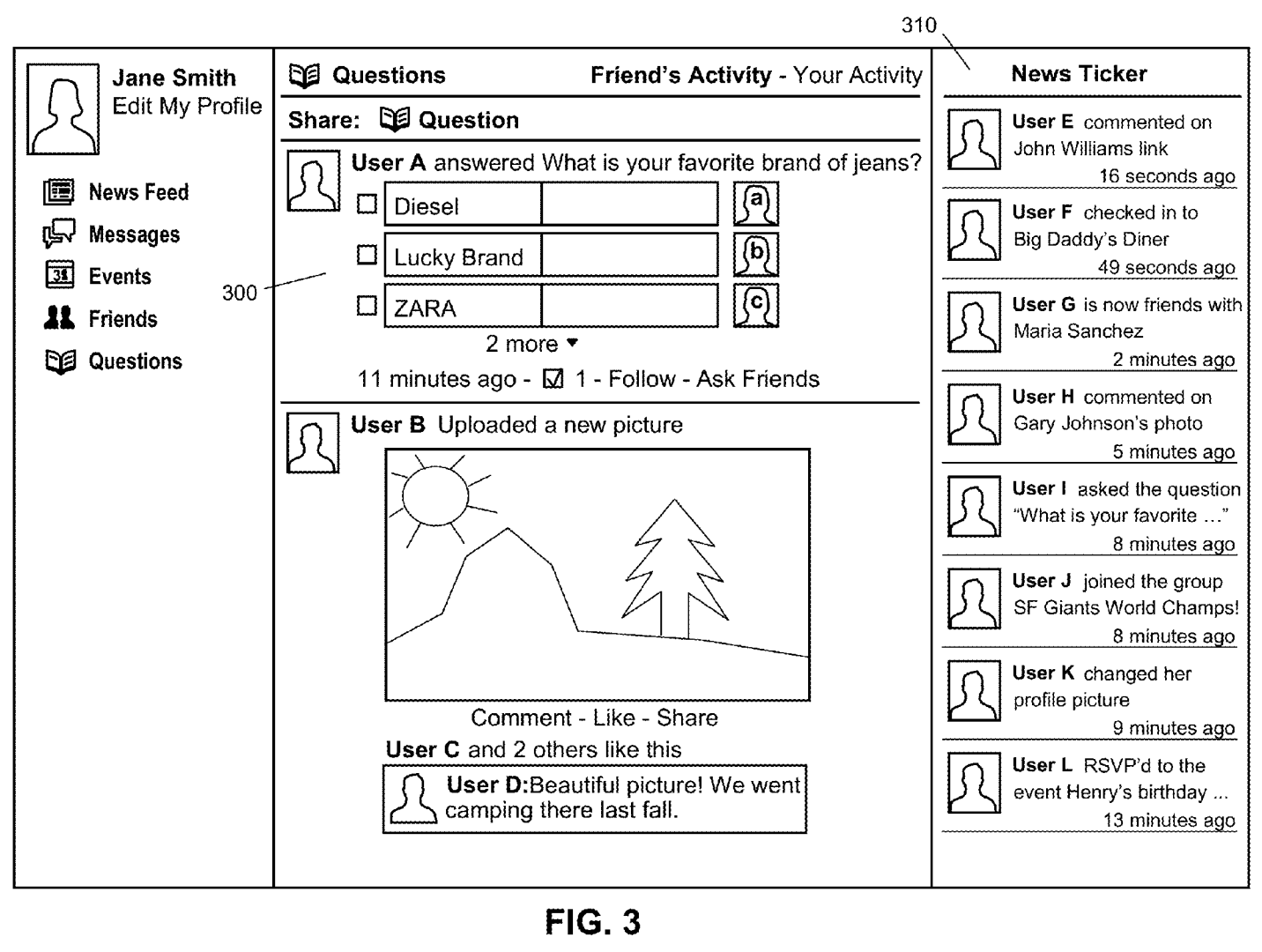

FIG. 3 is an example screenshot illustrating a social networking system interface for displaying news stories in a newsfeed and a news ticker, according to one embodiment. In the embodiment of FIG. 3, a social networking system newsfeed 300 is displayed for the user Jane Smith. The newsfeed 300 includes various stories determined to be relevant to the user Jane Smith, for instance, a question asked by User A (with associated answer interface), and a picture uploaded by User B (with likes by User C and others, as well as a comment by User D). Adjacent to the newsfeed is a news ticker 310. The news ticker 310 includes various stories by users connected to Jane Smith, in chronological order. The news ticker 310 may update automatically; as a new story is identified (based on an action involving a user connected to Jane Smith occurring subsequent to the display of the most recent story), the story is displayed in the news ticker 310.

Figure 4:
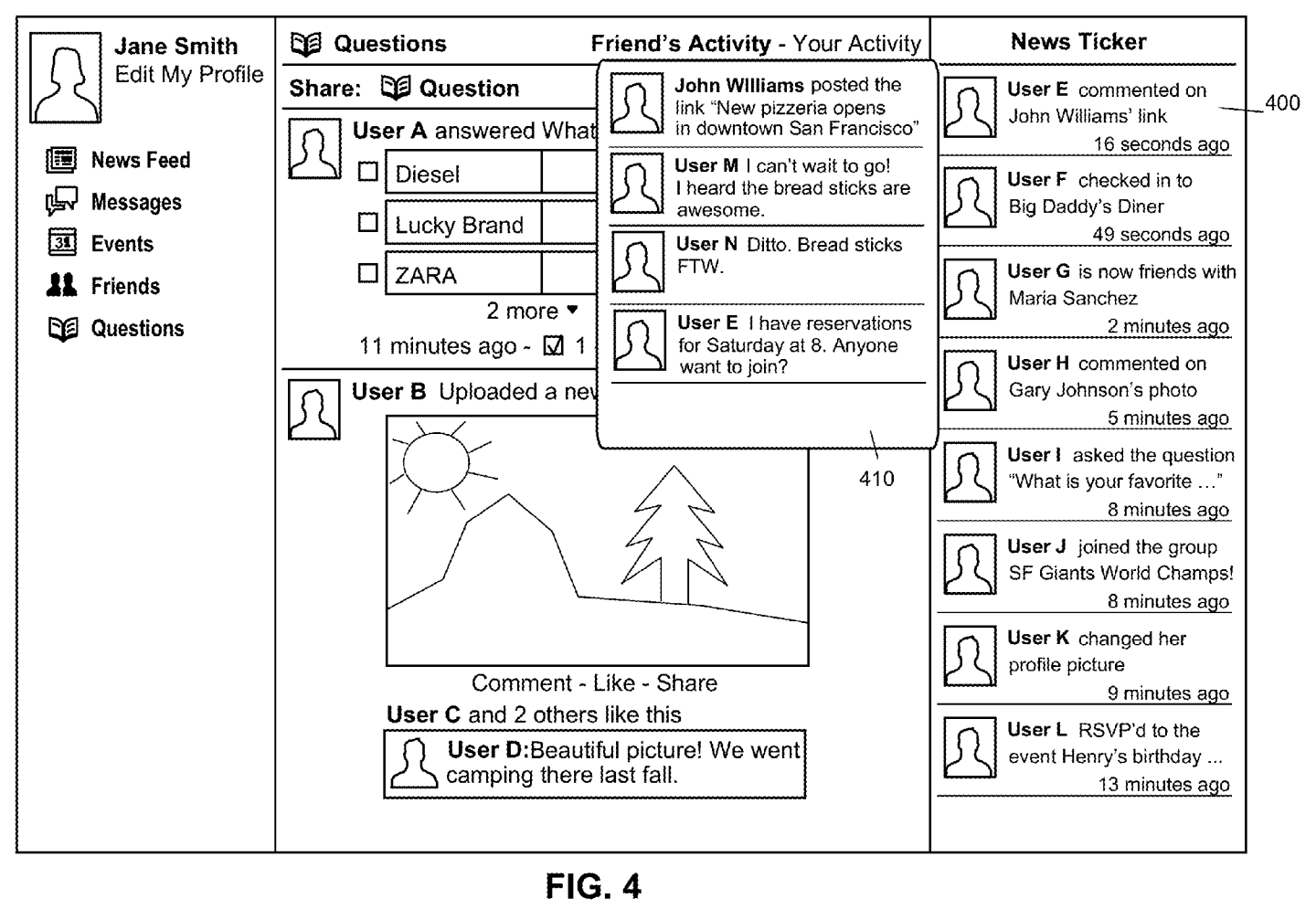

FIG. 4 is an example screenshot illustrating the interface of FIG. 3, along with additional information for a selected news ticker story, according to one embodiment. In the embodiment of FIG. 4, it is assumed that the user Jane Smith selected the news ticker story 400, "User E commented on John Williams' link." In response, the window 410 is displayed adjacent to the news ticker 310, and over the newsfeed 300. The window 410 contains additional information related to the story 400. In the embodiment of FIG. 4, the additional information includes the original link posted by John Williams, a picture of John Williams, and all comments made on the posted link, including a comment by User M, a comment by User N, and a comment by User E (the comment associated with the story 400). In one embodiment, only comments by friends of Jane Smith are displayed in the window 410.

Figure 5:
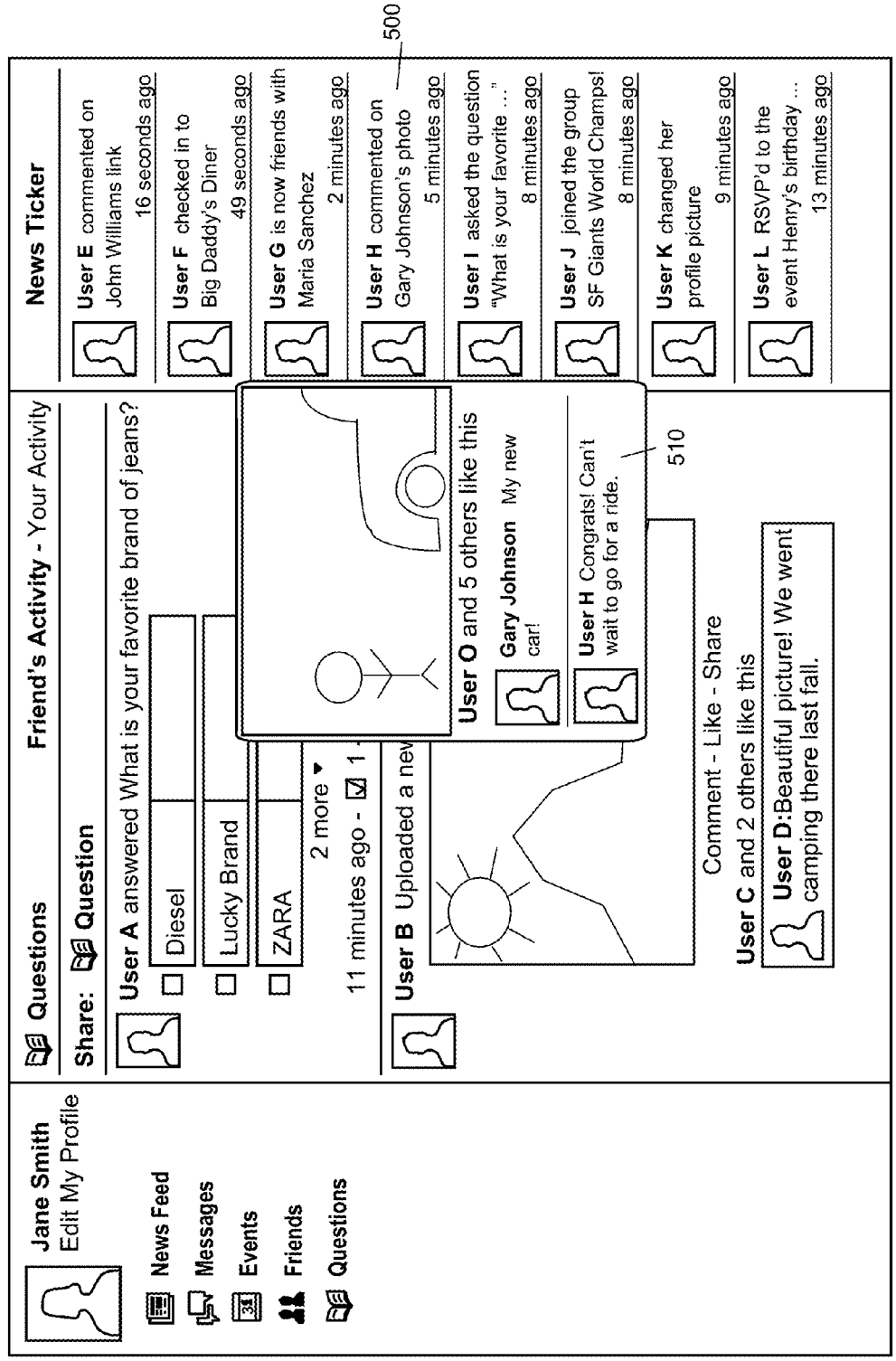
FIG. 5 is an example screenshot illustrating the interface of FIG. 3, along with additional information for a selected news ticker story, according to one embodiment.

FIG. 5 is an example screenshot illustrating the interface of FIG. 3, along with additional information for a selected news ticker story, according to one embodiment. In the embodiment of FIG. 5, it is assumed that the user Jane Smith selected the news ticker story 500, "User H commented on Gary Johnson's photo." In response, the window 510 is displayed, containing the photo on which User H commented, along with the comment by User H, the number of people who have "liked" the photo, and the identity of at least one user who "liked" the photo, namely User O. The window 510 may contain a link to the gallery containing the displayed photo, or may display the identities of individuals in the photo upon selection of the photo.

Figure 6:
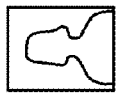
FIG. 6 is an example screenshot illustrating the interface of FIG. 3, along with additional information for a selected news ticker story, according to one embodiment.

FIG. 6 is an example screenshot illustrating the interface of FIG. 3, along with additional information for a selected news ticker story, according to one embodiment. In the embodiment of FIG. 6, it is assumed that the user Jane Smith selected the news ticker story 600, "User L RSVP'd to the event 'Henry's Birthday (Bash!)'." In response, the window 610 is displayed, containing the title of the event 'Henry's Birthday Bash!', a description of the event, a time and location of the event, and an interface to RSVP to the event or to comment on the event ("RSVP" and "Comment" buttons). In addition, the window 610 displays the number of people who have RSVP'd to the event, the identity of one of the people who RSVP'd (User L), and a comment by User P. In one embodiment, the window 610 may also contain a map to the location of the event.

Operation

Figure 7:
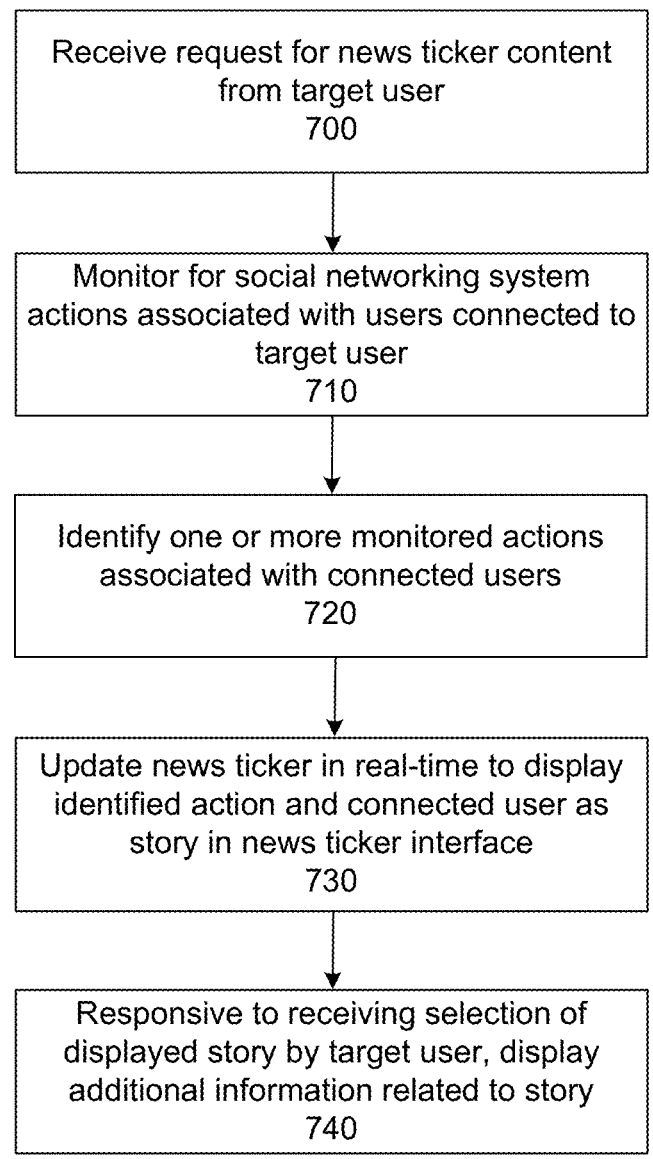
FIG. 7 is a flow chart illustrating a process for displaying news stories in a social networking system ticker interface, according to one embodiment.

FIG. 7 is a flow chart illustrating a process for displaying news stories in a social networking system ticker interface, according to one embodiment. A request is received 700 from a target user for news ticker content. The request may include accessing a social networking system page containing a news ticker, and the request may be continual so long as the target user continues to access the social networking system page. In response to such a request, the social networking system is monitored 710 for actions associated with users connected to the target user. Monitoring for actions in a social networking system may be continual and real-time.

One or more monitored actions of users connected to the target user are identified 720. Actions include becoming connected to another user in the social networking system, uploading or commenting on a photograph, playing a game within the social networking system, RSVPing to an event in the social networking system, and playing a media content within the social networking system. Responsive to identifying one or more monitored actions, updating 730 the news ticker in real-time to display the identified action and the associated connected user as a story within the news ticker interface. Responsive to receiving a selection of the displayed story by the target user, additional information related to the story is displayed 740 to the target user.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
monitoring a social networking system for actions associated with users connected to a target user;
generating a story comprising an identified action and a user connected to the target user associated with the identified action;
determining, by a processor, the relevance of the identified action to the target user;
responsive to the determined relevance exceeding a pre-determined threshold, displaying the generated story in a newsfeed interface; and
responsive to the determined relevance failing to exceed the pre-determined threshold, displaying the generated story in a news ticker interface.

2. The method of claim 1, wherein the social networking system is continually monitored for actions associated with connected users while the news ticker interface is displayed to the target user, and wherein the news ticker interface is updated without a request of the target user.

3. The method of claim 1, wherein the identified action comprises an action performed by the user connected to the target user.

4. The method of claim 1, wherein the identified action comprises an action involving the user connected to the target user.

5. The method of claim 1, wherein the user connected to the target user comprises a user who has established a connection with the target user.

6. The method of claim 1, wherein the news ticker interface is adjacent to the newsfeed interface.

7. The method of claim 6, wherein the newsfeed interface and the newsticker interface comprise adjacent columns within a social networking system interface.

8. The method of claim 6, wherein the news ticker interface comprises a column displaying news ticker stories chronologically.

9. The method of claim 7, wherein displaying a generated story in the news ticker interface comprises displaying the generated story at the top of the news ticker interface column and shifting one or more other displayed stories downward.

10. The method of claim 1, wherein the news ticker interface is continually updated in real time responsive to identifying new monitored actions determined to be below the pre-determined threshold of relevance without requiring input from the target user.

11. The method of claim 1, further comprising, responsive to receiving a selection of a story displayed within the news ticker interface by the target user, displaying information related to a context of the selected story within the news ticker interface.

12. The method of claim 11, wherein the information is displayed in a dedicated interface adjacent to the news ticker interface.

13. The method of claim 12, wherein the dedicated interface adjacent to the news ticker interface comprises a window.

14. The method of claim 12, wherein the dedicated interface adjacent to the news ticker interface comprises a column.

15. The method of claim 11, wherein the selected story comprises an endorsement of an object, and wherein the displayed information comprises information related to the object.

16. The method of claim 11, wherein the selected story comprises a communication about an object, and wherein the displayed information comprises information related to the object.

17. The method of claim 11, wherein the selected story comprises a communication, and wherein the displayed information comprises additional communications related to the communication.

18. The method of claim 11, wherein the selected story comprises an establishment of a connection between a user connected to the target user and a third user, and wherein the displayed information comprises information related to the third user.

19. The method of claim 11, wherein the displayed information comprises biographic information associated with the connected user.

20. The method of claim 11, wherein the displayed information comprises an image associated with the connected user.

21. The method of claim 11, wherein displaying information related to the context of the identified action and the connected user comprises one of: displaying an image, playing a media item, displaying event information, displaying information about a user, displaying a game, and displaying communications related to the action.

22. A non-transitory computer program product comprising a computer-readable memory storing computer-executable code configured to, when executed by a computer processor, perform steps comprising:
- monitoring a social networking system for actions associated with users connected to a target user;
- generating a story comprising an identified action and a user connected to the target user associated with the identified action;
- determining the relevance of the identified action to the target user;
- responsive to the determined relevance exceeding a pre-determined threshold, displaying the generated story in a newsfeed interface; and
- responsive to the determined relevance failing to exceed the pre-determined threshold, displaying the generated story in a news ticker interface.

\* \* \* \* \*